(12) United States Patent
Lin

(10) Patent No.: US 12,225,973 B2
(45) Date of Patent: Feb. 18, 2025

(54) METHOD FOR MANUFACTURING RECYCLED CARBON FIBER UNDERLAY AND RECYCLED CARBON FIBER ARCH INSOLE WITH RECYCLED CARBON FIBER UNDERLAY

(71) Applicant: DR. FOOT TECHNOLOGY CO., LTD., Yilan County (TW)

(72) Inventor: Wei-Cheng Lin, Yilan County (TW)

(73) Assignee: DR. FOOT TECHNOLOGY CO., LTD., Yilan County (TW)

( * ) Notice: Subject to any disclaimer, the term of this patent is extended or adjusted under 35 U.S.C. 154(b) by 72 days.

(21) Appl. No.: 18/108,675

(22) Filed: Feb. 13, 2023

(65) Prior Publication Data

US 2024/0180294 A1  Jun. 6, 2024

(30) Foreign Application Priority Data

Dec. 1, 2022 (TW) .................................. 111146104

(51) Int. Cl.
| | |
|---|---|
| A43B 17/00 | (2006.01) |
| B29C 45/00 | (2006.01) |
| B29D 35/00 | (2010.01) |
| B29D 35/12 | (2010.01) |
| C08J 5/04 | (2006.01) |
| B29K 77/00 | (2006.01) |
| B29K 307/04 | (2006.01) |
| B29L 31/50 | (2006.01) |

(52) U.S. Cl.
CPC ........ *A43B 17/003* (2013.01); *B29C 45/0005* (2013.01); *B29D 35/0009* (2013.01); *B29D 35/122* (2013.01); *C08J 5/042* (2013.01); *B29C 2045/0008* (2013.01); *B29K 2077/00* (2013.01); *B29K 2307/04* (2013.01); *B29L 2031/507* (2013.01); *C08J 2377/02* (2013.01)

(58) Field of Classification Search
CPC .......................... A43B 17/003; B29C 45/0005
USPC ............................................................. 36/43
See application file for complete search history.

(56) References Cited

U.S. PATENT DOCUMENTS

| | | | | |
|---|---|---|---|---|
| 5,528,842 | A * | 6/1996 | Ricci ...................... | A43B 21/30 36/38 |
| 11,627,777 | B2 * | 4/2023 | Bailey ...................... | C08L 7/00 428/408 |
| 2005/0229431 | A1 * | 10/2005 | Gerlin .................. | A43B 13/188 36/25 R |
| 2019/0343216 | A1 * | 11/2019 | Huffa ...................... | D04B 1/12 |

(Continued)

*Primary Examiner* — Timothy K Trieu

(57) ABSTRACT

A method for manufacturing a recycled carbon fiber underlay, which mixes recycled carbon fiber material with nylon or composite plastic and forms an elastic recycled carbon fiber injection particle material, and under an injection process condition, the recycled carbon fiber injection particle material is injected and molded into a recycled carbon fiber underlay. The recycled carbon fiber arch insole comprises a recycled carbon fiber underlay manufactured by the aforementioned manufacturing method, together with the data of podiatric medical big numeric database of human factors engineering for the innovative design of mechanical insole products and the application development of recycled materials to encourage recycling to reduce carbon emissions, while improving the function, durability, and comfort of insole inserts.

3 Claims, 5 Drawing Sheets

(56) References Cited

U.S. PATENT DOCUMENTS

2019/0344477 A1* 11/2019 Huffa ...................... B29B 11/16
2020/0022451 A1* 1/2020 Smith ................... B29C 39/003

* cited by examiner

METHOD FOR MANUFACTURING RECYCLED CARBON FIBER UNDERLAY AND RECYCLED CARBON FIBER ARCH INSOLE WITH RECYCLED CARBON FIBER UNDERLAY

CROSS-REFERENCE TO RELATED APPLICATION

This non-provisional application claims priority under 35 U.S.C. § 119(a) on Patent Application No(s). 111146104 filed in Taiwan, R.O.C. on Dec. 1, 2022, the entire contents of which are hereby incorporated by reference.

BACKGROUND OF THE INVENTION

1. Field of the Invention

The present disclosure relates to a technical field of arch insoles for footwear, and in particular to a recycled carbon fiber arch insole with a recycled carbon fiber underlay and a method for manufacturing the recycled carbon fiber underlay.

2. Description of the Related Art

For footwear, people generally place arch insoles in shoes, so as to reduce pressure and to increase shock absorption and comfort when walking and jogging, especially in the post-pandemic era, people pay a greater attention to health, and the demand for medical or health care mechanical functional arch insoles is also increasing.

The conventional arch insoles are mostly made of petrochemical plastic materials such as PP, PE plastic, pure carbon fiber, TPU, and resin carbon fiber composites, which are difficult to manufacture by molding due to inelasticity (such as too hard and too thick), so the usability is poor. In addition, although carbon fiber materials are widely used in footwear or other uses, there are still problems that the materials are hard and inelastic, and the aforementioned materials cannot be recycled and reused, which is easy to cause environmental pollution and century-old garbage problems, so it is urgent to develop and apply recycled raw materials through the gradually developing carbon fiber recycling material technology to improve the problems and create recycled and environmentally friendly economic products, in order to achieve the goal of carbon reduction in the process and product.

In addition, there are many types of arch insoles on the market, and most of them claim to have curative functions, but there are no actual human factors engineering or medical mechanics design and actual medical verification, and the existing arch insoles generally have insufficient support on the medial arch, and the shape and position of the transverse arch underlay are incorrectly designed, among other problems, which often leads to people who have related needs to waste money to try a pair or be deceived.

BRIEF SUMMARY OF THE INVENTION

In order to solve the various problems encountered in the above traditional arch insole, the present disclosure provides a method for manufacturing a recycled carbon fiber underlay, and a recycled carbon fiber arch insole, the recycled carbon fiber arch insole comprises a recycled carbon fiber underlay manufactured by the aforementioned manufacturing method. Currently, the production of 1 ton of recycled carbon fiber (RCF) will produce 4 to 4.5 tons of $CO_2$ emissions that is calculated by the recycling process, compared with the current public data of carbon fiber process on the market, the production of 1 ton of carbon fiber (CF) will produce 20 tons of $CO_2$ emissions, and the use of recycled carbon fiber materials can effectively reduce carbon emissions by nearly 80%.

The method for manufacturing the recycled carbon fiber underlay comprises the following steps: providing a recycled carbon fiber material, the recycled carbon fiber material has a first content percentage and a first weight percentage; providing a nylon or composite plastic material, the nylon or composite plastic has a second content percentage and a second weight percentage, the sum of the second content percentage and the first content percentage is 100 percent, and the sum of the second weight percentage and the first weight percentage is 100 percent; mixing the recycled carbon fiber material with the nylon or composite plastic to form an elastic recycled carbon fiber injection particle material; and injecting and molding the recycled carbon fiber injection particle material into a recycled carbon fiber underlay under an injection process condition, and the injection process condition includes at least one of a preset mold temperature, a preset cooling time, a preset screw speed, a preset injection time, and a preset in-mold partitioned temperature.

In an embodiment, the first content percentage is 10% to 30%, the second content percentage is 70% to 90% but the present invention is not limited thereto.

In an embodiment, the first weight percentage is 50%, the second weight percentage is 50% but the present invention is not limited thereto.

In an embodiment, the recycled carbon fiber material is, for example, 0.1 mm to 0.5 mm staple fiber powder but the present invention is not limited thereto.

In an embodiment, the nylon or composite plastic is one of a PA6 grade nylon and a PA12 grade nylon.

In an embodiment, the preset mold temperature is 70° C. but the present invention is not limited thereto.

In an embodiment, the preset cooling time is 15 seconds but the present invention is not limited thereto.

In an embodiment, the preset screw speed is 88 rpm but the present invention is not limited thereto.

In an embodiment, the preset injection time is 1.5 seconds but the present invention is not limited thereto.

In an embodiment, the preset in-mold partitioned temperature is 260° C. of a first partition temperature to 225° C. of a fifth partition temperature but the present invention is not limited thereto.

The recycled carbon fiber arch insole comprises a recycled carbon fiber underlay, and the recycled carbon fiber underlay is manufactured by the method for manufacturing the recycled carbon fiber underlay.

In an embodiment, the recycled carbon fiber arch insole further comprises a first cushion layer, stacked on the recycled carbon fiber underlay.

In an embodiment, the first cushion layer defines a full foot length, and a length of the recycled carbon fiber underlay is three-quarters of the full foot length.

In an embodiment, the recycled carbon fiber arch insole further comprises a graphene underlay, stacked on the first cushion layer.

In an embodiment, a length of the graphene underlay is equal to the full foot length.

In an embodiment, the graphene underlay is made by knitting and mixing 92% graphene yarn and 8% elastic yarn but the present invention is not limited thereto.

In an embodiment, a surface of the graphene underlay is further printed with a honeycomb graphene material.

In an embodiment, the recycled carbon fiber arch insole further comprises at least one second cushion layer, sandwiched between the recycled carbon fiber underlay and the first cushion layer.

In an embodiment, the first cushion layer is a foaming material, the at least one second cushion layer is a rubber sheet.

In an embodiment, the recycled carbon fiber underlay has a specific contour, and the specific contour depends on a plurality of corresponding contour statistical values of a numeric database.

In an embodiment, the plurality of corresponding contour statistical values include a contour statistical value corresponding to a foot middle median length, a contour statistical value corresponding to a foot medial median length, a contour statistical value corresponding to a foot lateral median length, a contour statistical value corresponding to a forefoot width of a foot, a contour statistical value corresponding to an arch width of the foot, a contour statistical value corresponding to a heel width of the foot, a contour statistical value corresponding to a top height of a medial arch of the foot, a contour statistical value corresponding to a position of the medial arch of the foot, a contour statistical value corresponding to a top height of a lateral arch of the foot, and a contour statistical value corresponding to a position of the lateral arch of the foot.

In an embodiment, the specific contour has an arch height and a width, the arch height includes a low arch height, a normal arch height, and a high arch height, the width includes a narrow version width, a normal version width, and a wide version width.

As mentioned above, by using recycled carbon fiber materials instead of traditional plastic materials to manufacture the recycled carbon fiber underlay and the recycled carbon fiber arch insole comprising the recycled carbon fiber underlay, the effect of recycling and reuse can be effectively achieved to meet environmental protection requirements, and the usability of the recycled carbon fiber arch insole can be increased because of the characteristics of recycled carbon fiber materials themselves, such as lightweight, high elasticity, fatigue resistance, ease of manufacturing, high strength and toughness, and not easily deform.

In addition, the contour of the recycled carbon fiber underlay can be designed into various sizes according to different foot shape conditions by using big data, and can meet different needs, and can therefore be customized, increasing the variability of use. In addition, the use of far infrared health care function of graphene material can also make the recycled carbon fiber arch insole have a health care effect.

DETAILED DESCRIPTION OF THE INVENTION

To facilitate understanding of the object, characteristics, and effects of the present disclosure, preferable embodiments together with the attached drawings for the detailed description of the present disclosure are provided.

Figure 1:
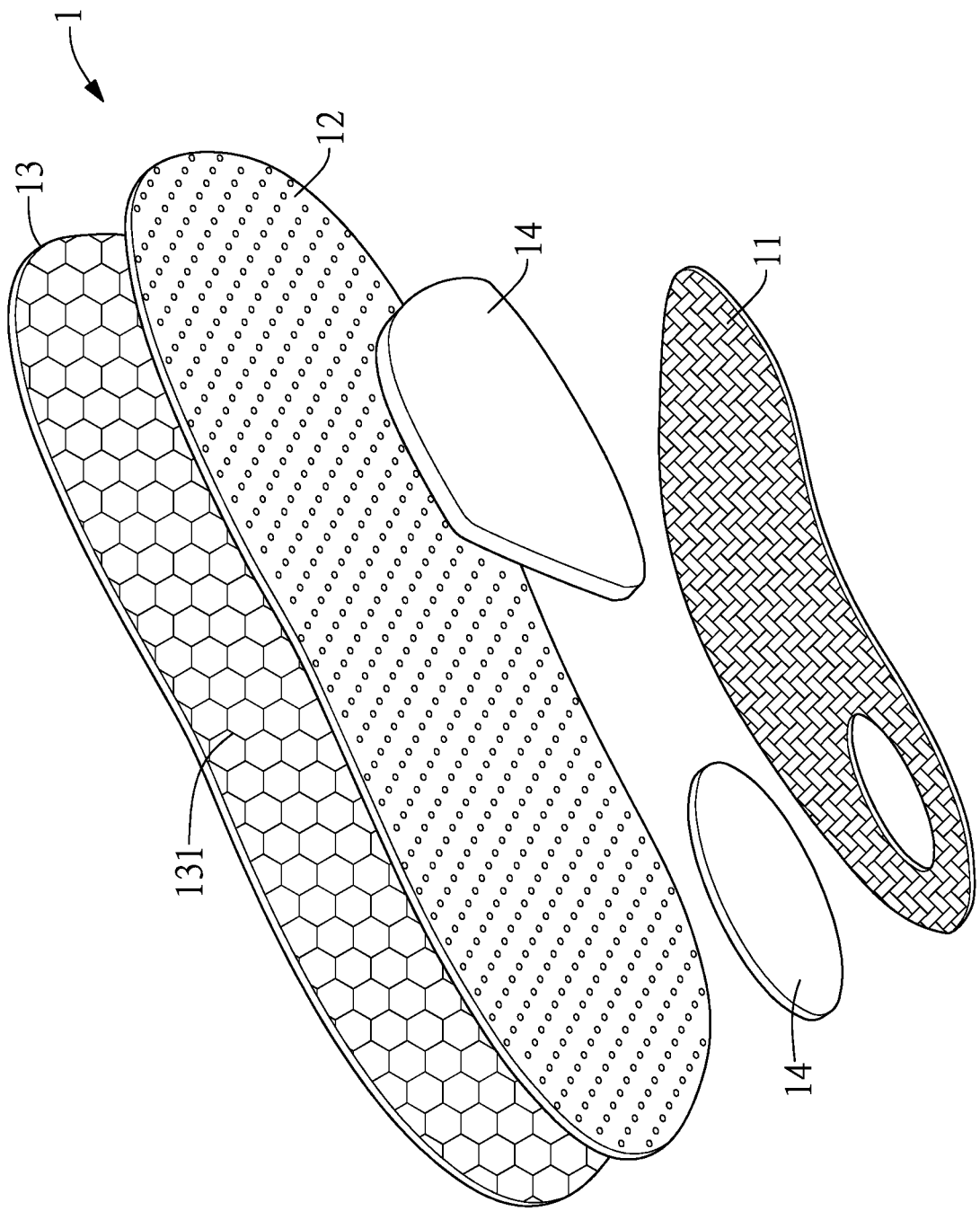
FIG. 1 is an exploded view of a recycled carbon fiber arch insole of an embodiment of the present disclosure.

Referring to FIG. 1, which is an exploded view of a recycled carbon fiber arch insole of an embodiment of the present disclosure. FIG. 1 shows a recycled carbon fiber arch insole 1 that may be placed in a shoe (not shown), the recycled carbon fiber arch insole 1 mainly comprises a recycled carbon fiber underlay 11 and a first cushion layer 12. As shown in FIG. 1, in the present embodiment, the recycled carbon fiber arch insole 1 further comprises a graphene underlay 13 and two second cushion layers 14, wherein the first cushion layer 12 is stacked on the recycled carbon fiber underlay 11, and the graphene underlay 13 is stacked on the first cushion layer 12, and the two second cushion layers 14 are respectively sandwiched between the recycled carbon fiber underlay 11 and the first cushion layer 12.

The first cushion layer 12 is a foaming material, the two second cushion layers 14 are respectively a rubber sheet, which can be used for decompression, shock absorption, in order to improve the comfort of people using (walking, jogging, pedaling, running) the recycled carbon fiber arch insole 1. Obviously the first cushion layer 12 and the second cushion layer 14 can also be made with the opposite design, that is, the first cushion layer 12 can be a rubber sheet, and the second cushion layer 14 can be a foaming material. In addition, the number of second cushion layer 14 is not limited to the two shown in FIG. 1. In some embodiments one, three, or other quantities are also allowed, and its shape, the size of length, width, and height, setting position, etc., may also be changed according to actual needs. For example, different designs can be made according to different arch height, foot width, foot length, etc.

The graphene underlay 13 (may also be referred to as a graphene surface cloth) in the present embodiment is made by knitting and mixing, for example, 92% graphene yarn and 8% elastic yarn, and a surface of the graphene underlay 13 is further printed with a honeycomb graphene material 131, so that the graphene content may further be increased. Graphene can have health effects, such as helping blood circulation on the soles of the feet, increasing blood flow rate, and the graphene underlay 13 designed in the above way has, for example, a far infrared emissivity of more than 0.83, which can help the limb temperature test up to 13° C., increase blood flow by 11%, blood flow rate by 12%, increase finger blood oxygen concentration by 1.0, skin feels-like temperature by 0.9° C. when using the recycled carbon fiber arch insole 1.

As mentioned above, the recycled carbon fiber arch insole 1 comprises the recycled carbon fiber underlay 11, that is, recycled carbon fiber materials are used instead of traditional plastic materials to make underlays, so as to effectively achieve the effect of recycling and reuse to meet environmental protection requirements. In addition, recycled carbon fiber materials themselves have a variety of characteristics, such as lightweight, thinness, high elasticity, fatigue resistance, ease of manufacturing, high strength and toughness, not easy to deform, so recycled carbon fiber materials are used to make underlays and they are used in the recycled carbon fiber arch insole 1 that can increase the usability of the recycled carbon fiber arch insole 1. The method for manufacturing the recycled carbon fiber underlay 11 is described as follows.

Figure 2:
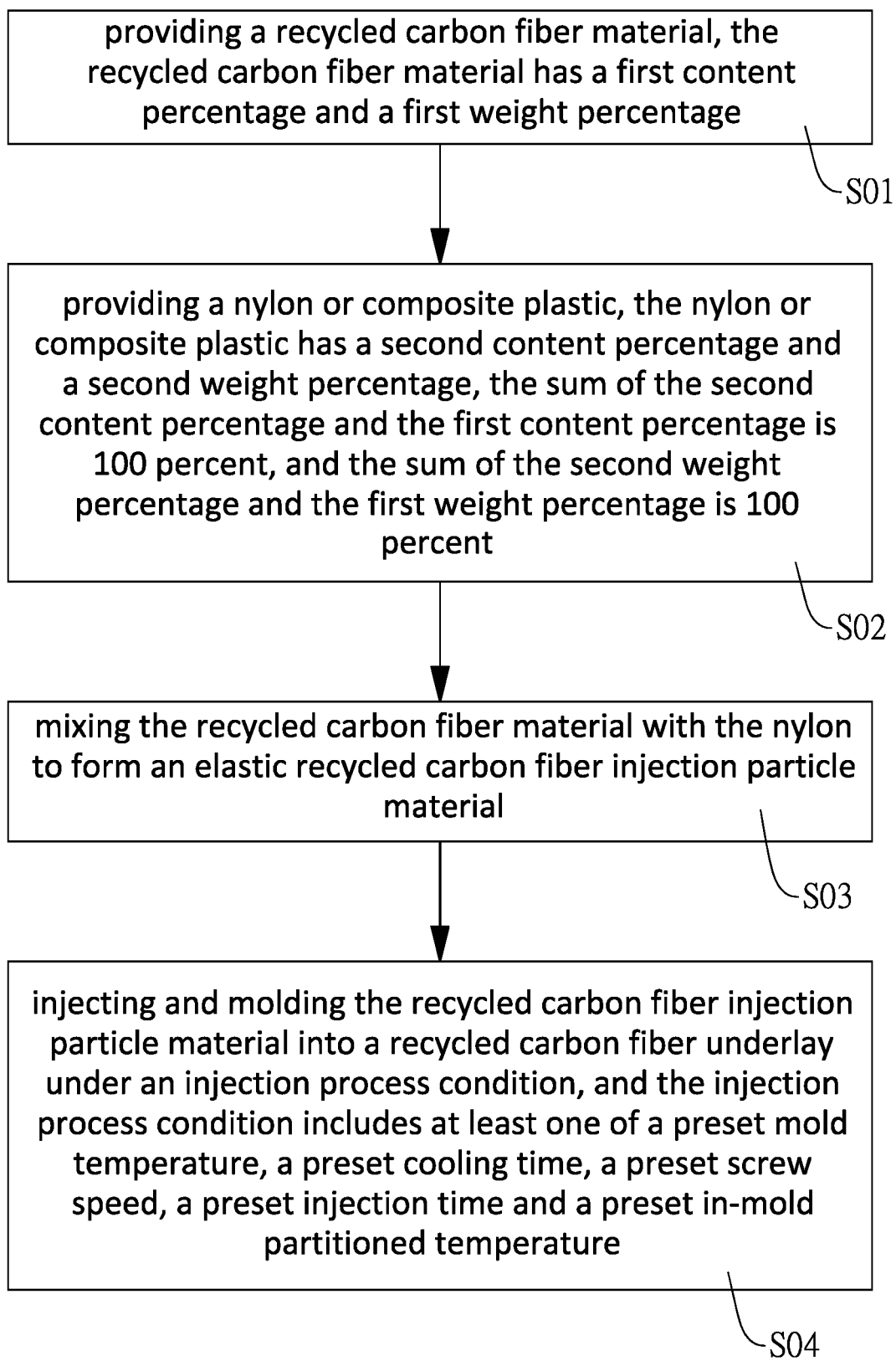
FIG. 2 is a flowchart of a method for manufacturing a recycled carbon fiber underlay of an embodiment of the present disclosure.

Referring to FIG. 2, which is a flowchart of a method for manufacturing a recycled carbon fiber underlay according to an embodiment of the present disclosure, and the steps of the method for manufacturing the recycled carbon fiber underlay 11 utilized in the recycled carbon fiber arch insole 1 are shown in the flowchart, and please also refer to FIG. 1 at the same time.

The steps of the method for manufacturing the recycled carbon fiber underlay 11 comprise: first, a recycled carbon fiber material is provided, the recycled carbon fiber material has a first content percentage and a first weight percentage (step S01). In the present embodiment, the first content percentage of the aforementioned recycled carbon fiber material is, for example, 10% to 30%, such as 10%, 15%, 20%, 25%, 30%, and the first weight percentage is, for example, 50%.

Next, a nylon or composite plastic material is provided, the nylon or composite plastic has a second content percentage and a second weight percentage, and the sum of the second content percentage of nylon or composite plastic and the first content percentage of the recycled carbon fiber material is 100 percent, and the sum of the second weight percentage of nylon or composite plastic and the first weight percentage of the recycled carbon fiber material is 100 percent (step S02). In the present embodiment, the second content percentage of the aforementioned nylon or composite plastic is, for example, 70% to 90%, and the second weight percentage is, for example, 50%.

In the first content percentage of the recycled carbon fiber material and the second content percentage of the nylon or composite plastic, for example, when the first content percentage is 10%, the second content percentage is 90%, when the first content percentage is 15%, the second content percentage is 85%, when the first content percentage is 20%, the second content percentage is 80%, when the first content percentage is 25%, the second content percentage is 75%, when the first content percentage is 30%, the second content percentage is 70%. Certainly, the change that the first content percentage is 12% and the second content percentage is 88%, the first content percentage is 13% and the second content percentage is 87%, the first content percentage is 16% and the second content percentage is 84%, the first content percentage is 18% and the second content percentage is 82%, etc., can also be allowed, that is, it can also be changed according to the actual manufacturing demand.

Afterwards, the recycled carbon fiber material is mixed with the nylon or composite plastic to form an elastic recycled carbon fiber injection particle material (step S03), which is called the mixing process.

Then, under an injection process condition, the recycled carbon fiber injection particle material is injected and molded into a recycled carbon fiber underlay 11, and the injection process condition includes at least one of a preset mold temperature, a preset cooling time, a preset screw speed, a preset injection time, and a preset in-mold partitioned temperature (step S04).

In the above-mentioned step S04, at least one of the various parameters comprised in the injection process condition may be set according to the amounts of the first content percentage and the first weight percentage of the recycled carbon fiber material and the amounts of the second content percentage and second weight percentage of the nylon or composite plastic, for example, the first content percentage and the first weight percentage of the recycled carbon fiber material are respectively 15% and 50%, and the second content percentage and the second weight percentage of the nylon or composite plastic are respectively 85% and 50%, the injection process condition includes a preset mold temperature of 70° C., a preset cooling time of 15 seconds, a preset screw speed of 88 rpm, a preset injection time of 1.5 seconds, and a preset in-mold partitioned temperature of 260° C. of a first partition temperature to 225° C. of a fifth partition temperature.

The various parameter settings comprised in the above injection process condition can be individually adjusted to produce the required recycled carbon fiber underlay 11 under different content and weight ratios, such as a recycled carbon fiber underlay 11 with a tensile strength of 125±10 MPa, a flexural strength of 192±10 MPa, and a flexural modulus of 6.6±2 GPa.

The above recycled carbon fiber material is, for example, 0.1 mm to 0.5 mm staple fiber powder, such as 0.1 mm, 0.2 mm, 0.3 mm, 0.4 mm, 0.5 mm, and the nylon or composite plastic can be one of a PA6 grade nylon and a PA12 grade nylon, certainly, other composite plastics can also be used. Similarly, at least one of the various parameters comprised in the above injection process condition may also be set according to the different types of the recycled carbon fiber materials and nylon or composite plastics described above, so as to obtain, for example, a recycled carbon fiber underlay 11 that meets the above test conditions.

Referring to FIG. 1 again, as described above, the recycled carbon fiber arch insole 1 comprises the recycled carbon fiber underlay 11, the second cushion layer 14, the first cushion layer 12, and the graphene underlay 13 stacked with each other, wherein the first cushion layer 12 defines a full foot length, that is, a length of the entire foot plate from the heel to the toe, and a length of the graphene underlay 13 is equal to the full foot length, that is, the graphene underlay 13 and the first cushion layer 12 have the same length, as can be seen from FIG. 1, the graphene underlay 13 and the first cushion layer 12 have the same appearance contour, certainly, the graphene underlay 13 and the first cushion layer 12 may also be designed for different lengths, different appearance contours.

In addition, a length of the recycled carbon fiber underlay 11 is three-quarters of the full foot length and includes a range of a heel bone (hind foot) and a midfoot bone (middle foot), i.e., three-quarters arch insole frame design. In detail, the recycled carbon fiber underlay 11 has a specific contour, and the specific contour depends on a plurality of corresponding contour statistical values of a numeric database, wherein the numeric database is a numeric database of people's foot shapes, which may be data of customers' foot shapes accumulated by the general industry selling related arch insole products after many years or data of subjects' foot shapes accumulated by relevant medical research units studying different foot shapes (e.g., foot shapes with three different arch heights of low, normal and high), and the numeric database can also be further divided into data of different racial foot shapes, for example, the specific contour of the recycled carbon fiber underlay 11 can depend on the (big) numeric database of 37,500 Asian adult foot shapes accumulated by the industry selling related arch insole products for years.

Figure 3:
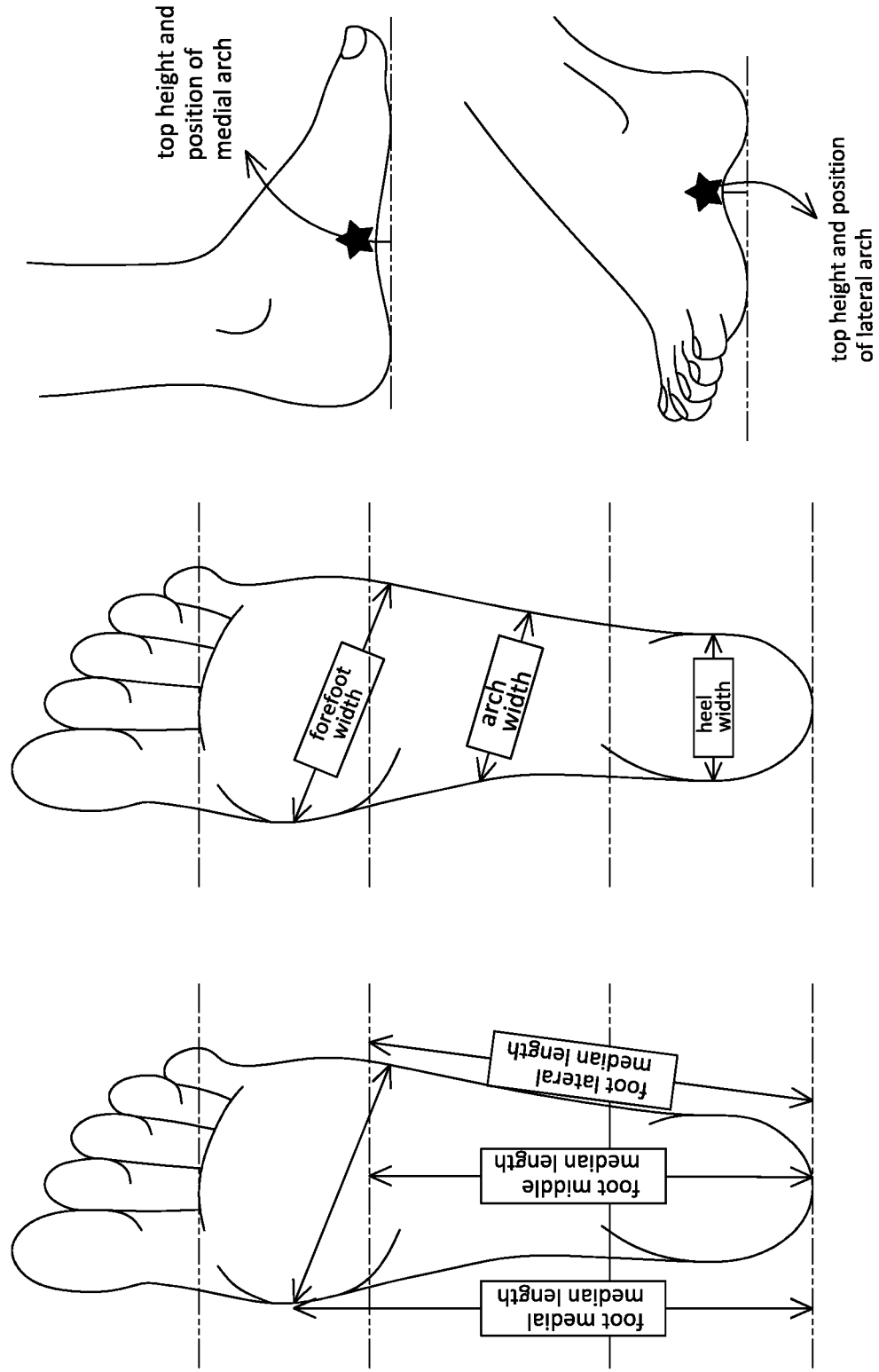
FIG. 3 is schematic first view of a definition of a foot shape of an embodiment of the present disclosure.
Figure 4:
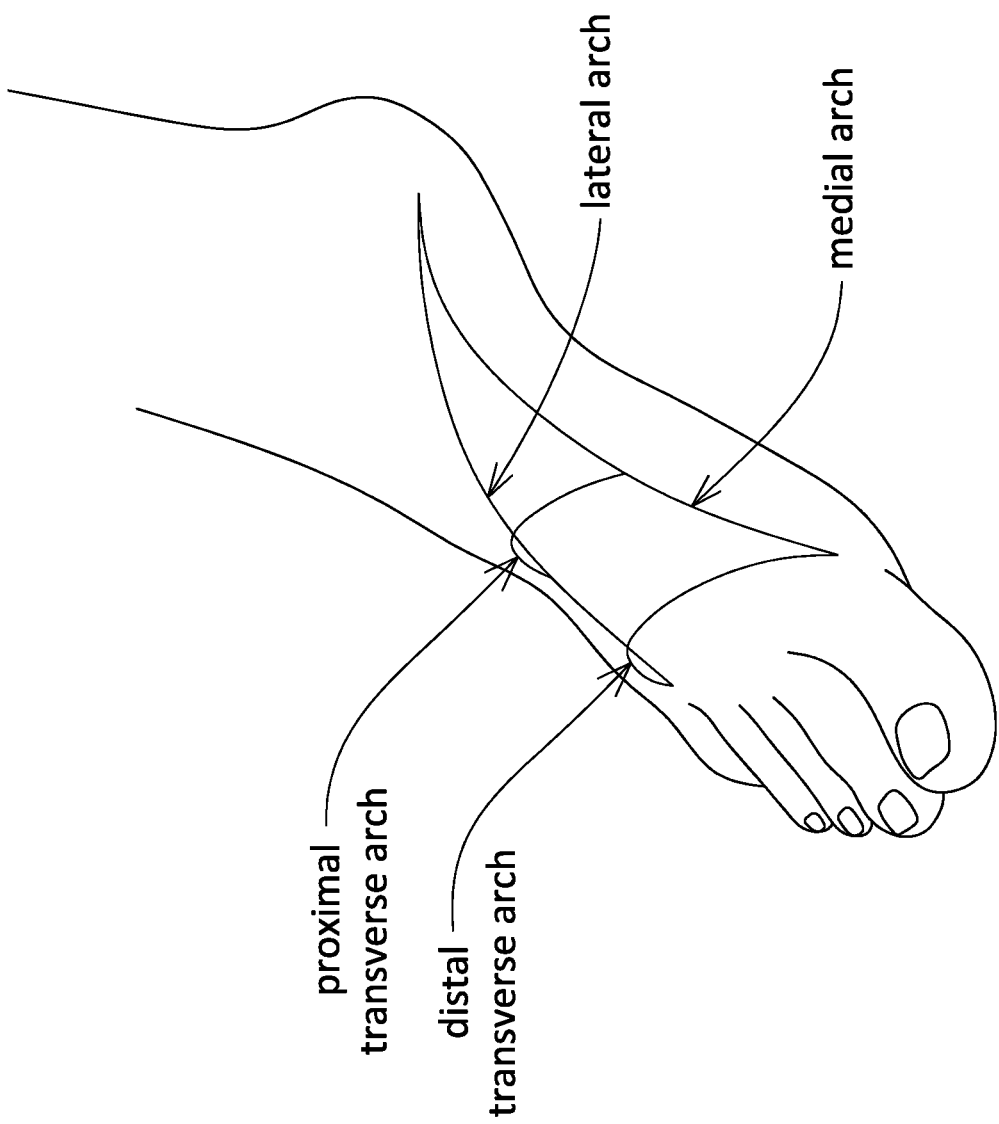
FIG. 4 is a schematic second view 2 of the definition of the foot shape of an embodiment of the present disclosure.

Referring to FIGS. 3 and 4 at the same time, wherein FIG. 3 is a schematic first view of a definition of a foot shape of an embodiment of the present disclosure, and FIG. 4 is schematic second view of the definition of the foot shape of an embodiment of the present disclosure. To be explained in advance, FIGS. 3 and 4 are for reference only, illustrating the definition of the foot shape in the art, and it is a technical content familiar to a person skilled in the art.

Referring to FIGS. 3 and 4, the plurality of corresponding contour statistical values include a contour statistical value corresponding to a foot middle median length, a contour statistical value corresponding to a foot medial median length, a contour statistical value corresponding to a foot lateral median length, a contour statistical value corresponding to a forefoot width of a foot, a contour statistical value corresponding to an arch width of the foot, a contour statistical value corresponding to a heel width of the foot, a contour statistical value corresponding to a top height of a medial arch of the foot, a contour statistical value corresponding to a position of the medial arch of the foot, a contour statistical value corresponding to a top height of a lateral arch of the foot, and a contour statistical value corresponding to a position of the lateral arch of the foot. Therefore, the specific contour of three-quarters arch insole frame design of the recycled carbon fiber underlay 11 can be obtained from the design of the statistical values of the above big data (the so-called human factors engineering), and the recycled carbon fiber underlay 11 manufactured therefrom can meet goals of improved ergonomics.

Figure 5:
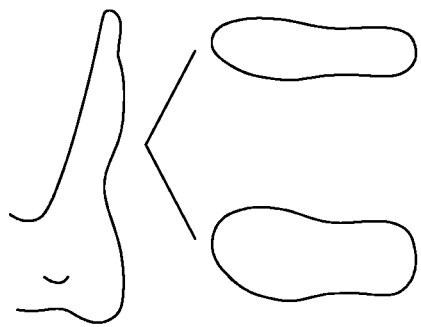
FIG. 5 is a schematic view of the contour change of the recycled carbon fiber underlay of an embodiment of the present disclosure.
Figure 5:
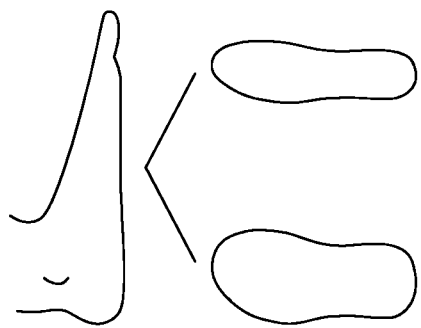
Figure 5:
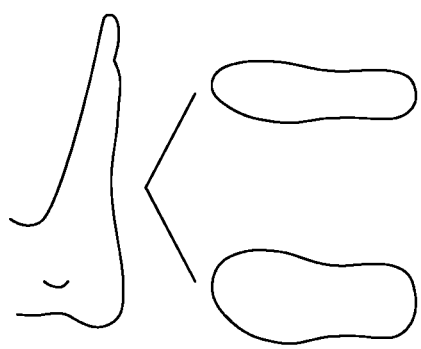

Referring to FIG. 5, which is a schematic view of the contour change of the recycled carbon fiber underlay of an embodiment of the present disclosure. As mentioned above, the specific contour of the recycled carbon fiber underlay 11 can be designed into various sizes according to different foot shape conditions by using big data, for example, the specific contour has an arch height and a width, which can meet different needs, and can therefore be customized (such as use for daily activity, use for intense exercise, use for corrective support), increasing the variability of use. For example, as shown in FIG. 5, low, normal, and high arch heights are displayed from left to right (i.e., a low arch height, a normal arch height and a high arch height), and each arch height design further has sizes of a narrow version, a normal version, and a wide version (i.e., a narrow version width, a normal version width, and a wide version width) in response to the application needs of the current many shoe types and versions, the specific contour of three-quarters arch insole frame design of the recycled carbon fiber underlay 11 can be changed by the above big data for the aforementioned different conditions. Accordingly, many variations in size can be obtained to meet different needs.

While the present invention has been described by means of specific embodiments, those skilled in the art should understand the above description merely comprises embodiments of the present invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A recycled carbon fiber arch insole, comprising:
a recycled carbon fiber underlay;
a first cushion layer stacked on the recycled carbon fiber underlay;
a graphene underlay stacked on the first cushion layer; and
at least one second cushion layer sandwiched between the recycled carbon fiber underlay and the first cushion layer,
wherein the recycled carbon fiber underlay has a specific contour, and the specific contour depends on a plurality of corresponding contour statistical values of a numeric database, the plurality of corresponding contour statistical values include a contour statistical value corresponding to a foot middle median length, a contour statistical value corresponding to a foot medial median length, a contour statistical value corresponding to a foot lateral median length, a contour statistical value corresponding to a forefoot width of a foot, a contour statistical value corresponding to an arch width of the foot, a contour statistical value corresponding to a heel width of the foot, a contour statistical value corresponding to a top height of a medial arch of the foot, a contour statistical value corresponding to a position of the medial arch of the foot, a contour statistical value corresponding to a top height of a lateral arch of the foot, and a contour statistical value corresponding to a position of the lateral arch of the foot.

2. The recycled carbon fiber arch insole according to claim 1, wherein a length defined by the recycled carbon fiber underlay is three-quarters of a length defined by the first cushion layer.

3. The recycled carbon fiber arch insole according to claim 1, wherein the specific contour has an arch height and a width, the arch height includes a low arch height, a normal arch height, and a high arch height, and the width includes a narrow version width, a normal version width, and a wide version width.

* * * * *